United States Patent
Dey et al.

(10) Patent No.: US 10,467,658 B2
(45) Date of Patent: Nov. 5, 2019

(54) SYSTEM, METHOD AND RECORDING MEDIUM FOR UPDATING AND DISTRIBUTING ADVERTISEMENT

(71) Applicant: International Business Machines Corporation, Armonk, NY (US)

(72) Inventors: Kuntal Dey, New Delhi (IN); Seema Nagar, Bangalore (IN); Roman Vaculin, Bronxville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 412 days.

(21) Appl. No.: 15/180,265

(22) Filed: Jun. 13, 2016

(65) Prior Publication Data
US 2017/0358008 A1    Dec. 14, 2017

(51) Int. Cl.
*G06Q 30/02* (2012.01)
*H04L 29/08* (2006.01)

(52) U.S. Cl.
CPC ..... *G06Q 30/0275* (2013.01); *G06Q 30/0269* (2013.01); *G06Q 30/0277* (2013.01); *H04L 67/02* (2013.01); *H04L 67/22* (2013.01)

(58) Field of Classification Search
USPC .......... 705/14.66, 14.42, 14.73; 707/722
See application file for complete search history.

(56) References Cited

U.S. PATENT DOCUMENTS

2005/0108092 A1    5/2005  Campbell et al.
2011/0288928 A1*  11/2011  Patwa .................... G06Q 30/02
                                                        705/14.42

(Continued)

FOREIGN PATENT DOCUMENTS

WO    WO 03-050658 A2       6/2003
WO    WO 2009/116043 A1     9/2009
WO    WO 2014/052891        4/2014

OTHER PUBLICATIONS

Jacob, R. J., et al; "Eye tracking in human-computer interaction and usability research: Ready to deliver the promises." The mind's Eye: Cognitive and Applied Aspects of Eye Movement Research. Mind 2.3 (2003): 4.

(Continued)

*Primary Examiner* — Saba Dagnew
(74) *Attorney, Agent, or Firm* — Anthony Curro, Esq.; McGinn IP Law Group, PLLC

(57) ABSTRACT

A method, system, and non-transitory computer readable medium for an advertisement distribution system, include an eye-reaction tracking circuit configured to track eye-reaction of a user for each of a plurality of advertisements of at least a first advertisement group on a web page displayed on a display device, a scoring circuit configured to calculate a score for each of the plurality of advertisements of the first advertisement group based on the tracked eye-reaction of the user, an auctioning circuit configured to conduct an auction to determine winning advertisements based on advertiser parameters received from a database and the score of each of the plurality of advisements during a same viewing session of the web page, and a distribution circuit configured to populate an empty advertisement group having a plurality of empty advertisement slots with the winning advertisements.

17 Claims, 10 Drawing Sheets

(56) References Cited

U.S. PATENT DOCUMENTS

| | | | |
|---|---|---|---|
| 2013/0054576 A1* | 2/2013 | Karmarkar | G06F 17/30861 |
| | | | 707/722 |
| 2013/0246926 A1 | 9/2013 | Vemireddy | |
| 2014/0279070 A1* | 9/2014 | Ramakrishnan | G06Q 30/0277 |
| | | | 705/14.73 |
| 2015/0130703 A1 | 5/2015 | Ghajar | |
| 2015/0154650 A1 | 6/2015 | Umeda | |
| 2015/0206195 A1* | 7/2015 | Rangarajan | G06Q 30/0275 |
| | | | 705/14.66 |

OTHER PUBLICATIONS

Brown, Andy, et al; "Using qualitative eye-tracking data to inform audio presentation of dynamic Web content.", New review in Hypermedia and multimedia, Dec. 2010, retrieved on May 5, 2016.

* cited by examiner

ADVERTISEMENT DISTRIBUTION METHOD 200

SYSTEM, METHOD AND RECORDING MEDIUM FOR UPDATING AND DISTRIBUTING ADVERTISEMENT

BACKGROUND

The present invention relates generally to a system for updating and/or distributing advertisement, and more particularly, but not by way of limitation, to a system and method for dynamic updating of advertisement based on a user's evolution of interest, and for dynamic advertisement auctioning for remarketing based upon a user's eye-reaction to prior advertisement within a same content.

It is common to have content with empty slots for advertisements in a web page before the content, in the content, or after the content. The empty slots are populated with a static generation of an advertisement (i.e., a "one-time" population) such that the advertisement does not change after the web page has been loaded. The empty slots are conventionally auctioned away to commercial companies for their ads or advertising agencies for their client's ads.

Conventionally, auctioning for advertisements on a web page is a "one-time", static process. Hence, advertisements once rendered on a page do not get updated with the evolution of interests and/or cognition of a reader.

That is, the conventional techniques have a technical problem in that the conventional techniques do not consider in-session behavior-monitoring of a given user utilizing, for example, eye movement behavior with respect to advertisements shown at an earlier part of given content, and dynamic repetition of auctioning for the same slots previously generated as the user interest evolves over time during reading a web page.

SUMMARY

The inventors have considered the technical challenge and realized that there is a significant need for advertisement on a web page to evolve over time as interest of the user changes, and to generate new advertisement within the same content based on the interest of the user. Thus, the inventors have realized a technical solution to the technical challenge by using user interest data along with advertisement attributes to dynamically live-auction for ads between multiple potential advertisers, such that the winning advertisers/advertisements are selected for showing to the reader later within the same content, and dynamically update existing advertisement based on a change in the user's interest.

In an exemplary embodiment, the present invention can provide an advertisement distribution system, including an eye-reaction tracking circuit configured to track eye-reaction of a user each of a plurality of advertisements of at least a first advertisement group on a web page displayed on a display device, a scoring circuit configured to calculate a score for each of the plurality of advertisements of the first advertisement group based on the tracked eye-reaction of the user, an auctioning circuit configured to conduct an auction to determine winning advertisements based on advertiser parameters received from a database and the score of each of the plurality of advisements, and a distribution circuit configured to populate an empty advertisement group having a plurality of empty advertisement slots with the winning advertisements during a same viewing session of the web page. The empty advertisement group is disposed in a portion of the web page that has not yet been displayed by the display device.

Further, in another exemplary embodiment, the present invention can provide an advertisement distribution method, including tracking eye-reaction of a user each of a plurality of advertisements of at least a first advertisement group on a web page displayed on a display device, calculating a score for each of the plurality of advertisements of the first advertisement group based on the tracked eye-reaction of the user, conducting an auction to determine winning advertisements based on advertiser parameters received from a database and the score of each of the plurality of advisements, and populating an empty advertisement group having a plurality of empty advertisement slots with the winning advertisements during a same viewing session of the web page. The empty advertisement group is disposed in a portion of the web page that has not yet been displayed by the display device.

Even further, in another exemplary embodiment, the present invention can provide an advertisement updating system, including an eye-reaction tracking circuit configured to track eye-reaction of a user each of a plurality of advertisements of an advertisement group on a web page displayed on a display device, a interest calculating circuit configured to calculate an interest of the user for each advertisement of the advertisement group over time based on the tracked eye-reaction and assign each advertisement a user engagement value based on the interest, an auctioning circuit configured to conduct an auction to determine winning advertisements based on advertiser parameters received from a database and the user engagement value of each of the plurality of advisements, an auction timing calculating circuit configured to determine at least one time at which to cause the auctioning circuit to conduct the auction, and a distribution circuit configured to dynamically repopulate the advertisement group with the winning advertisements during a same viewing session of the web page.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
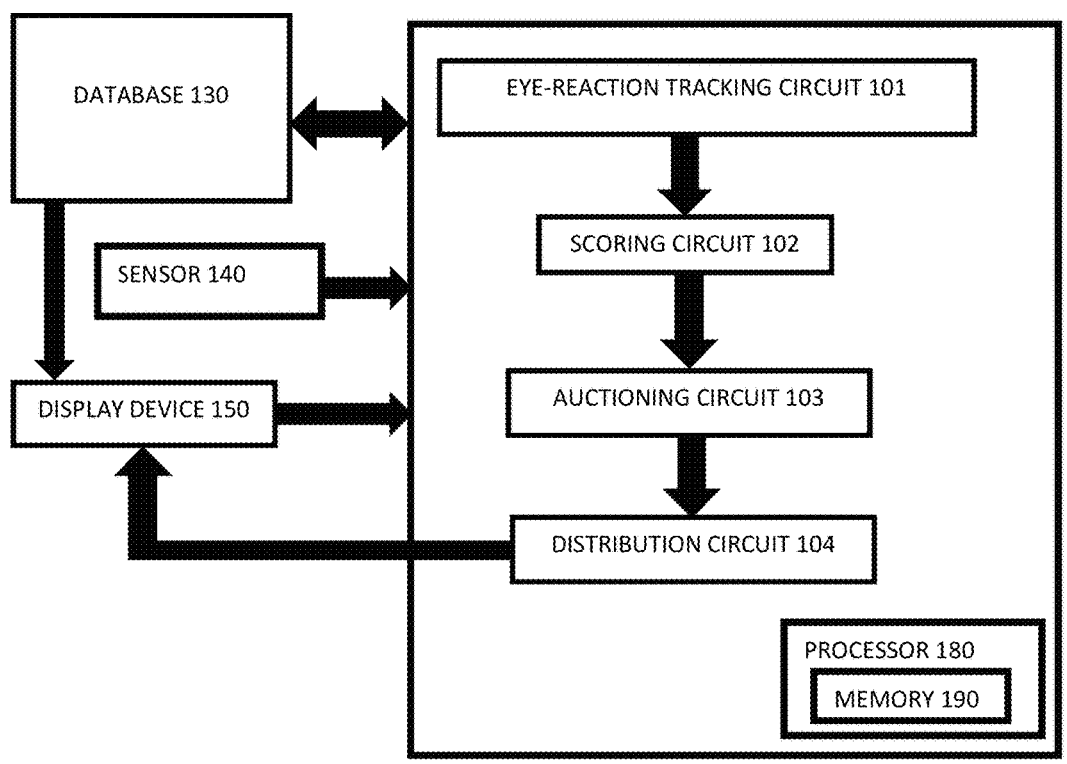
FIG. 1 exemplarily shows a block diagram illustrating a configuration of an advertisement distribution system 100.

The invention will now be described with reference to FIGS. 1-12, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the advertisement distribution system 100 includes an eye-reaction tracking circuit 101, a scoring circuit 102, an auctioning circuit 103, and a distribution circuit 104. The advertisement distribution system 100 includes a processor 180 and a memory 190, with the memory 190 storing instructions to cause the processor 180 to execute each circuit of the advertisement distribution system 100. The processor and memory may be physical hardware components, or a combination of hardware and software components.

Figure 5:
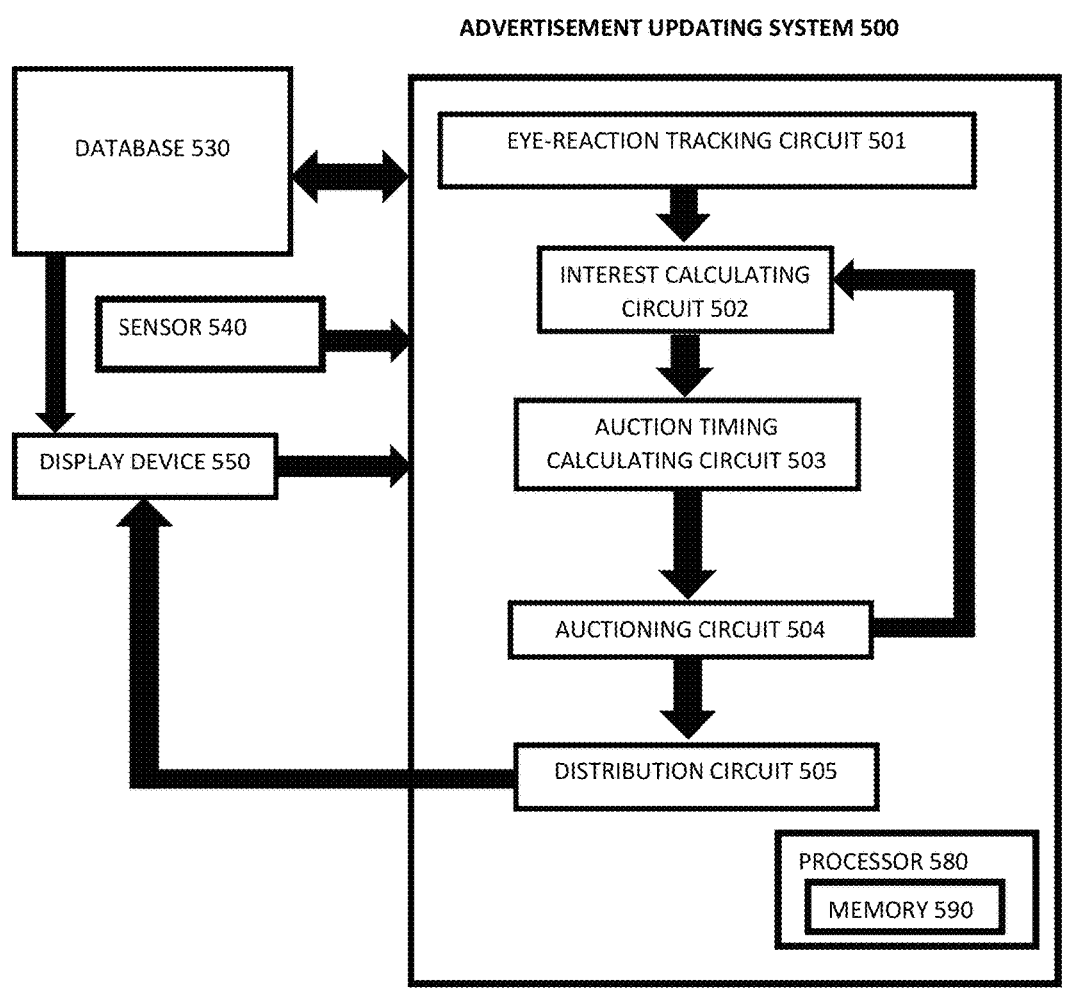
FIG. 5 exemplarily shows a block diagram illustrating a configuration of an advertisement updating system 500.

With reference to FIG. 5, the advertisement updating system 500 includes an eye-reaction tracking circuit 501, an interest calculating circuit 502, an auction timing circuit 503, an auctioning circuit 504, and a distribution circuit 505. The advertisement updating system 500 includes a processor 580 and a memory 590, with the memory 590 storing instructions to cause the processor 580 to execute each circuit of the advertisement updating system 500. The processor and memory may be physical hardware components, or a combination of hardware and software components.

Although the advertisement distribution system 100 and the advertisement updating system 500 include various circuits, it should be noted that the advertisement distribution system 100 and the advertisement updating system 500 can include modules in which the memory 190/590 stores instructions to cause the processor 180/580 to execute each module of the advertisement distribution system 100 and the advertisement updating system 500.

Also, each circuit can be a stand-alone device, unit, module, etc. that can be interconnected to cooperatively produce a transformation to a result.

With the use of these various circuits, the advertisement distribution system 100 and the advertisement updating system 500 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 10:
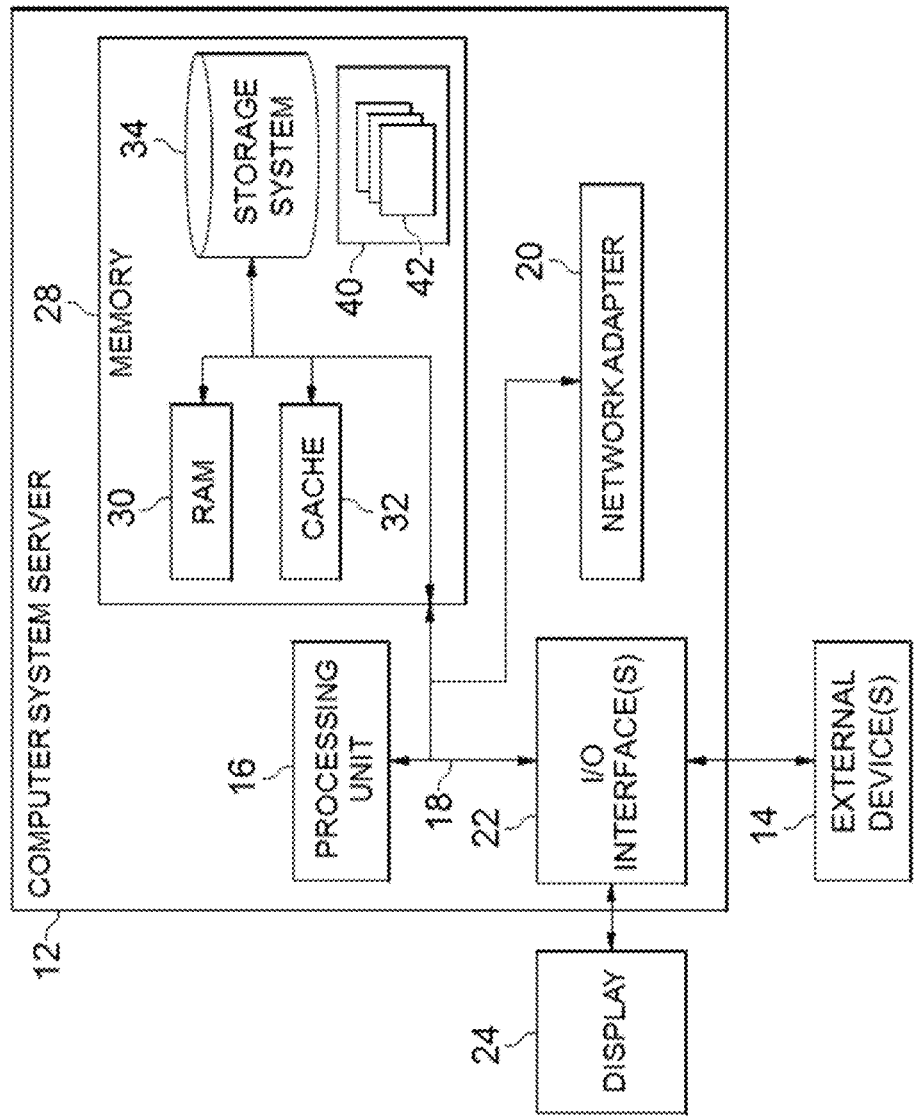
FIG. 10 depicts a cloud computing node according to an embodiment of the present invention.
Figure 11:
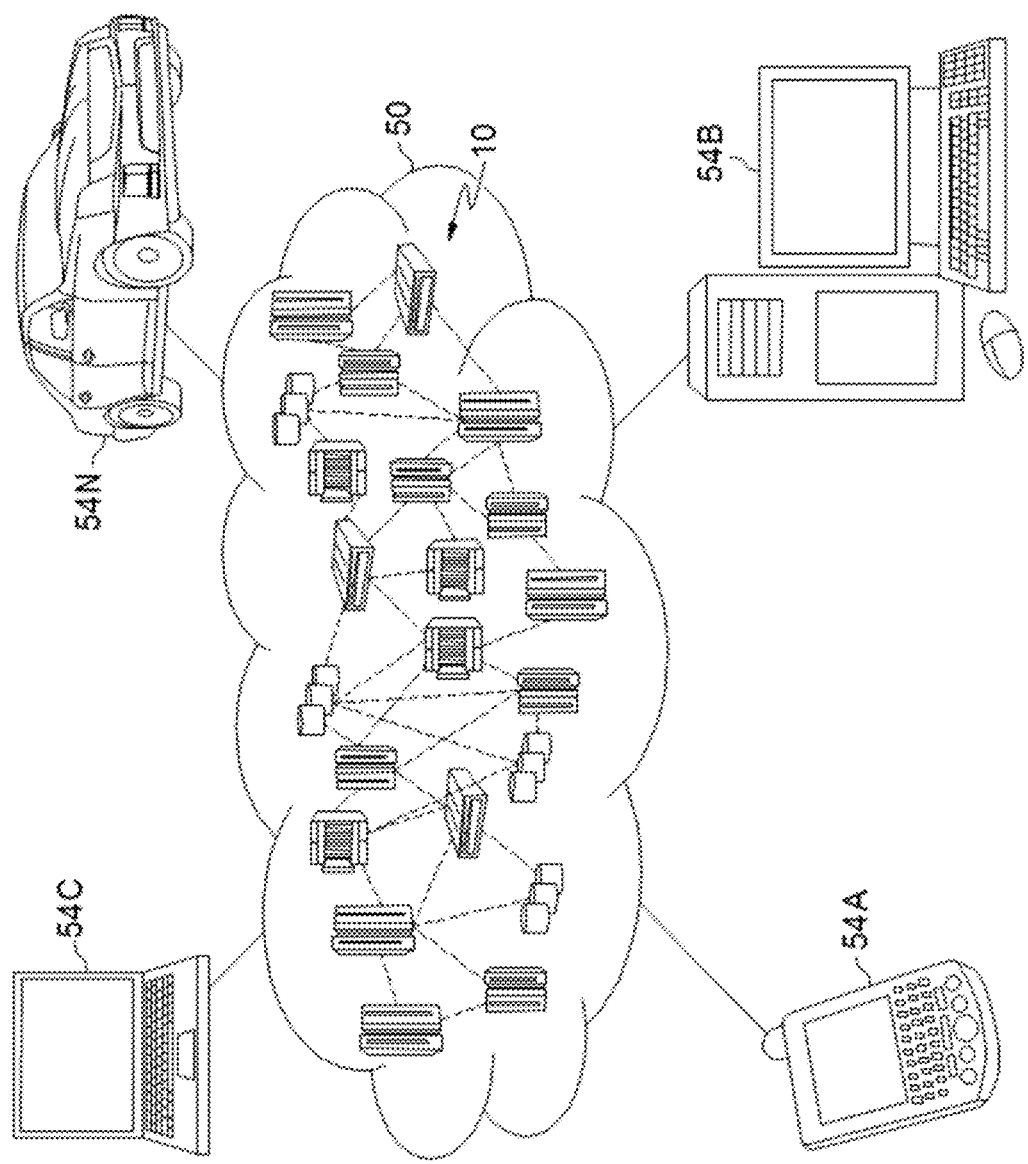
FIG. 11 depicts a cloud computing environment according to another embodiment of the present invention.
Figure 12:
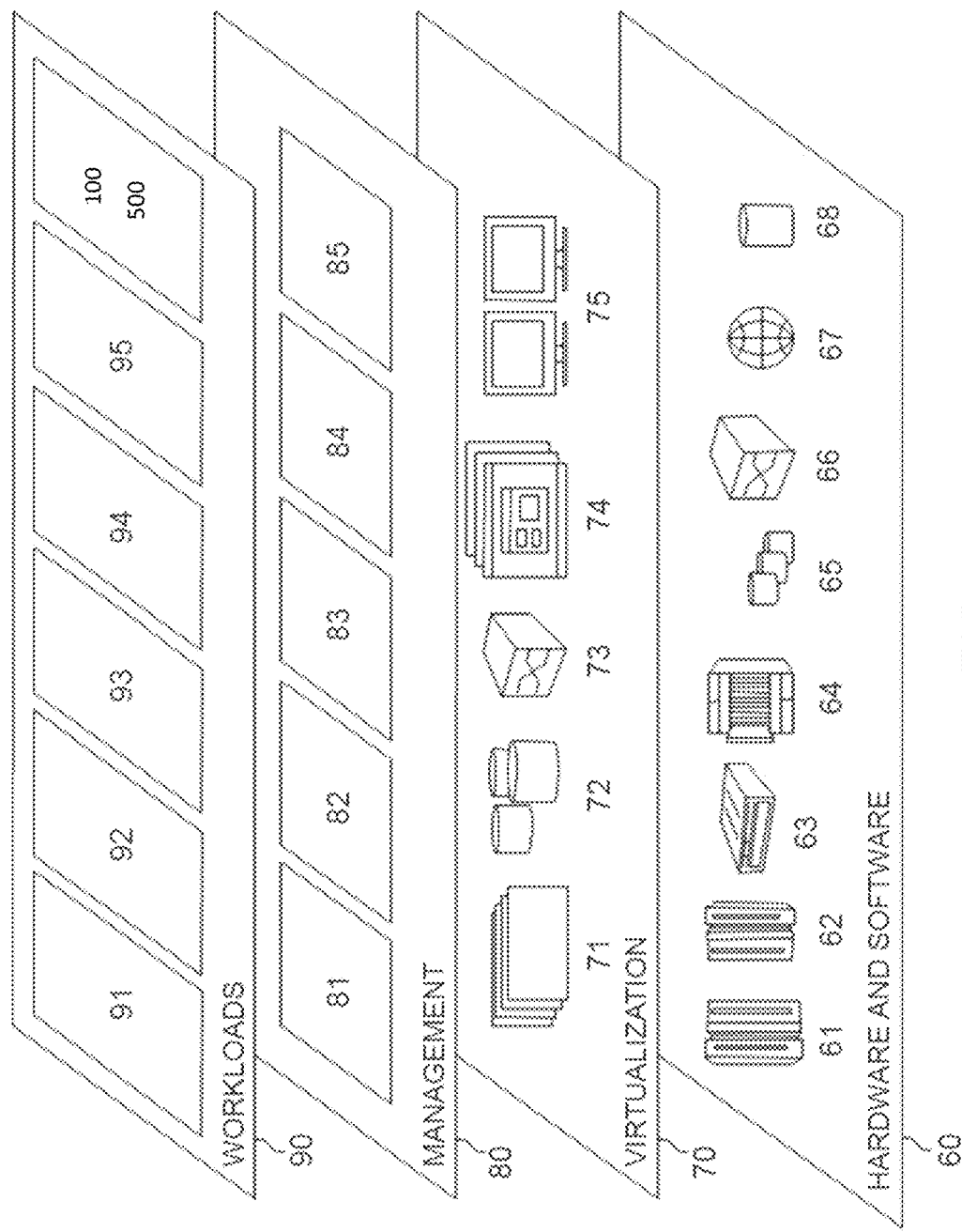
FIG. 12 depicts abstraction model layers according to an embodiment of the present invention.

Although as shown in FIGS. 10-12 and as described later, the computer system/server 12 is exemplarily shown in cloud computing node 10 as a general-purpose computing circuit which may execute in a layer the advertisement distribution system 100 and the advertisement updating system 500 (FIG. 12), it is noted that the present invention can be implemented outside of the cloud environment.

Figure 2:
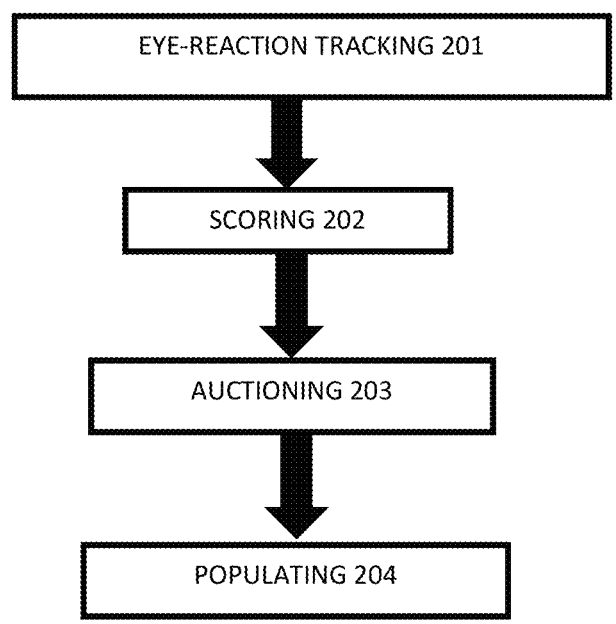
FIG. 2 exemplarily shows a high level flow chart for an advertisement distribution method 200.

With reference to FIG. 1, the system 100 receives one or more initial advertisement group(s), each group including at least one or more advertisements. For example, as shown in FIG. 2, the system 100 receives an advertisement group including "Ad1", "Ad2", and "Ad3" which is displayed at a predetermined position (i.e., the top) of a web page such that the user will view the advertisement group when the web page is first opened or viewed.

Figure 3:
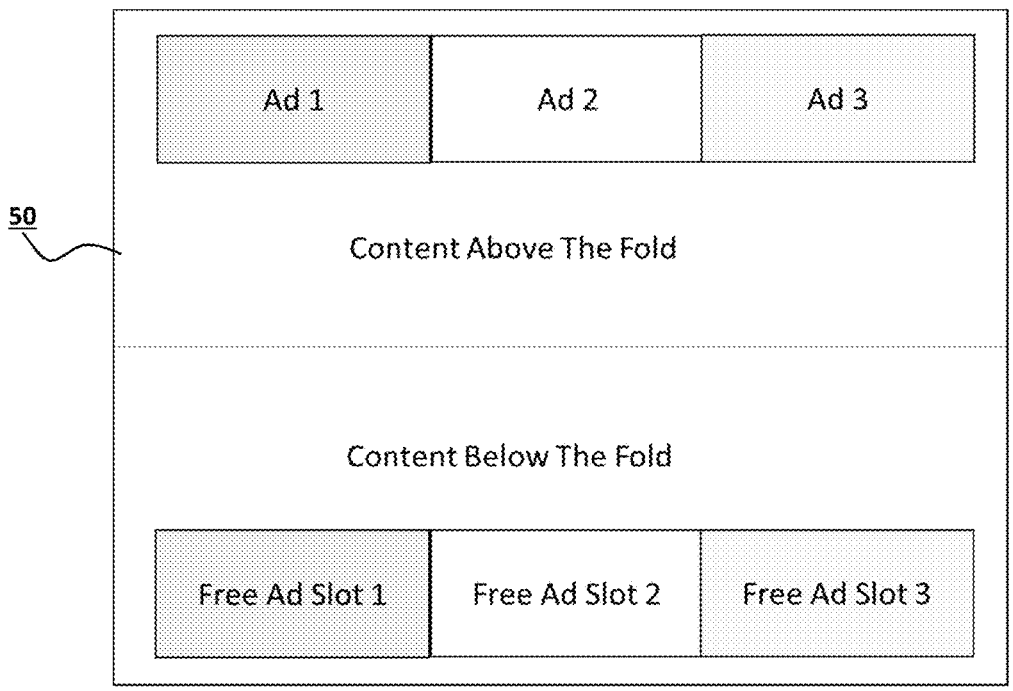
FIG. 3 exemplary shows a first depiction of an exemplary web page 50 displayed on a display device 150.

Although FIG. 3 exemplarily shows the first advertisement group including three advertisements to be populated, the invention is not limited thereto. Also, the system 100 receives a first empty group of slots of advertisements. However, the first empty group of slots of advertisements is not viewable on the web page at first. That is, the display device 150 displays the advertisement group in a portion of the web page immediately viewable by the user and displays the first empty group of slots of advertisements on a predetermined portion of the web page that is not viewable by the user until the user "scrolls" down on the web page. Preferably, the system 100 receives a number of empty slots equal to the size of the first advertisement group.

It is noted that the advertisement group is served from the database 130 to the system 100 based upon any traditional advertising processes or protocols.

The eye-reaction (i.e., gaze tracking, etc.) of the reader is monitored for the advertisement group (and each advertisement of the advertisement group) by the eye-reaction tracking circuit 101. The eye-reactions of the user are measured by the eye-reaction tracking circuit 101 via a sensor 140 such as fixations, scan paths, saccades and/or regressions to gauge a level of engagement of the user with each advertisement of the advertisement group. In other words, the eye-reaction tracking circuit 101 tracks the level of engagement of the user with each of the advertisements of the advertisement group by tracking the eye-reactions of the user with reference to the web page (i.e., the advertisements above the "content above the fold" of FIG. 3).

The sensor 140 can include any eye gaze tracking technology that is able to map the focus of the eye on the display device 150 (x,y) co-ordinates to the text and image content on the display device 150.

The scoring circuit 102 scores each of the advertisements of the advertisement groups based on the tracked eye-reactions by the eye-reaction tracking circuit 101. The scoring circuit 102 can score the advertisements of the advertisement group based on a relative score of eye-reactions by, for example, setting the total score as 100 percent and each advertisement can be given a portion of the total based on the tracked eye-reactions (i.e., the user engagement with each). Or, for example, the scoring circuit 102 can set each of the individual advertisements of the advertisement group to a static score based on predetermined parameters such as length of time that the user focused on the advertisement, the intensity of the user's focus, etc.

Further, for example, the scoring circuit 102 can score each of the advertisements of the advertisement group relative to a previous score based on the user. That is, each of the advertisements of the advertisement groups is scored based on whether the user's engagement with the advertisement is greater than a previous user engagement with the advertisement.

The auctioning circuit 103 receives in-page remarketing policies (i.e., an advertiser parameters) from the advertisement sellers stored in the database 130 such as the remarketing advertisement budget, content, modality, etc. The auctioning circuit 103 conducts an advertisement auction by using the score for the user calculated by the scoring circuit 102, along with the attributes of each of the advertisements, as well as the marketing and remarketing advertisement details and policies obtained from the advertisers. The auctioning circuit 103 determines advertisements that "win" the auction in which one or more winning advertisements/advertisers want to distribute particular advertisements (or remarket advertisements) based on the scoring results.

That is, the auctioning circuit 103 conducts an auction so as to determine which advertisements can be optimally remarketed or marketed at the bottom of the web page (i.e., the portion of the web page not currently being viewed by the user) based on the advertiser's parameters and the score according to the user's engagement with the advertisements.

Figure 4:
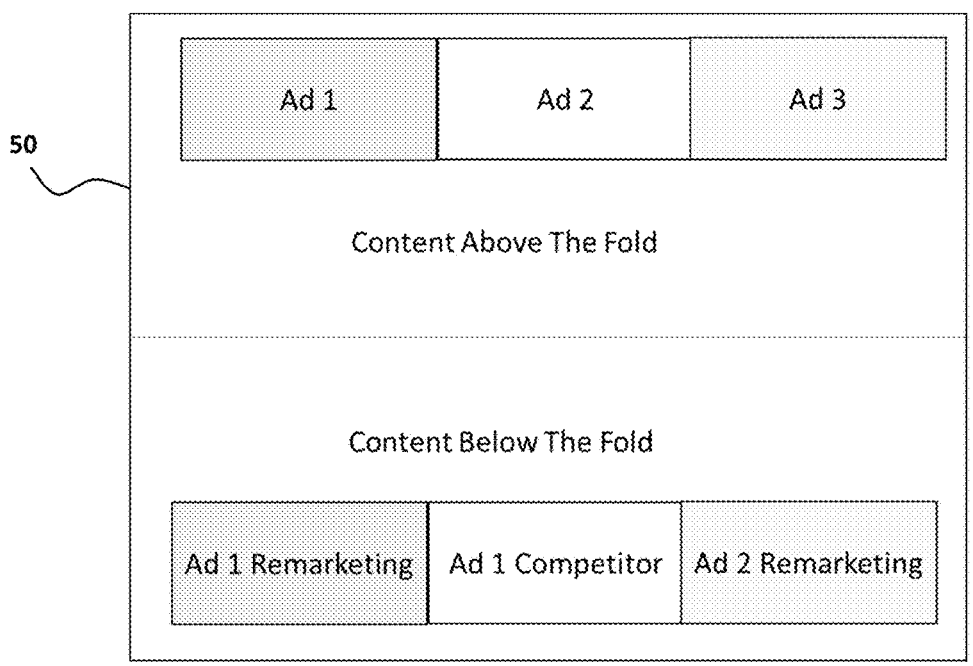
FIG. 4 exemplary shows a second depiction of the exemplary web page 50 displayed on the display device 150.

For example, as shown in FIG. 4, the eye-reaction tracking circuit 101 can detect that the user engages with "Ad1" consistently, "Ad2" for a few seconds before reading the web page, and never glances at "Ad3". The scoring circuit 102 calculates a score in which "Ad1" is given a high score, "Ad2" is given a relatively low score, and "Ad3" is given a negligible score. The auctioning circuit 103 creates an auction for the free advertisement slots as labeled in FIG. 3. For example, a first company releasing "Ad1" may have an advertiser parameter in which the first company only remarkets advertisements if it receives the highest score of all the advertisements. Also, a second company which competes with the first company may have an advertiser parameter in which the second company generates an advertisement to compete with "Ad1" if "Ad1" receives a highest score from the scoring circuit 102. Further, the third company that initially produced "Ad2" may have an advertiser parameter that "Ad2" can be remarketed if "Ad2" does not have a lowest score.

Based on the auction results by the auctioning circuit 103, the distribution circuit 104 populates the first empty group of slots of advertisements not being displayed on the web page with the "winners" of the auction. As exemplarily shown in FIG. 4, the distribution circuit 104 populates the first empty group of slots of advertisements not being displayed on the web page with a remarketing of "Ad1", a new "Ad1" from a competitor, and a remarketing of "Ad2".

That is, the "winning" advertisements are dynamically populated (loaded) by the distribution circuit 104 in the first empty group of slots of advertisements at relatively later parts of the content appearing nearer to the end or at the end of the webpage (i.e., the portion of the web page not currently viewed by the user) as the user reaches over time to the portion of the web page during the reading process of the web page by the user on the display device 150.

Thus, the empty groups of advertisements are populated in the portion of the web page that the user has not yet viewed, such that when the user approaches the end (or portion not yet viewed) of the web page by the distribution circuit 104 within a same web page that included the first advertisement group the user will be able to view the advertisements. For example, the distribution circuit 104 dynamically distributes the later set of winning advertisements based upon the live, in-session auction results of the auctioning circuit 103, as the user proceeds to read near the end of the content page.

It is noted that there can be multiple empty advertisement groups such that, after an empty advertisement group is populated, the system 100 repeats the score calculation and populates another empty advertisement group not yet displayed. In this sense, the system 100 can include multiple, dynamically-generated advertisement groups for longer web pages.

Thus, the system 100 dynamically creates a live-auction for advertisements on webpages and other online digital content pages in-session (i.e., within the reading session of a user reading a text), and provides to the live-auction system, the user's interaction data (obtained via eye gaze tracking and extracting parameters such as fixation, saccades, regression, and/or scan path, etc.) with a set of ads presented earlier on the same digital content page. Further, the system 100 dynamically lets the advertisers participate in the live auctioning process such that the advertisers can use the user's eye-based, ad-interaction behavior already seen earlier on the same content page, in the bidding process, for marketing and remarketing advertisements that appear in the later parts of the content, with specific policies that they can specify for such advertisements, and dynamically loads the later set of winning advertisements based upon the live in-session ad auction results, as the user proceeds to read near the end of the content page.

FIG. 2 shows a high level flow chart for a method 200 of advertisement distribution.

Step 201 monitors the eye-reaction of the user for the advertisement group (and each advertisement of the advertisement group) to measure a user engagement with the advertisements.

Step 202 scores each of the advertisements of the advertisement groups based on the tracked eye-reactions of Step 201.

Step 203 conducts an advertisement auction by using the score for the user calculated by Step 202, along with the attributes of each of the advertisements, as well as the marketing and remarketing advertisement details and policies obtained from the advertisers from a database 130. That is, step 203 determines advertisements that "win" the auction in which one or more winning advertisements/advertisers want to distribute particular advertisements (or remarket advertisements) based on the scoring results of Step 202.

Step 204 populates the first empty group of slots of advertisements not being displayed on the web page with the "winners" of the auction. That is, Step 204 dynamically distributes the later set of "winning" advertisements based upon the live in-session auction results of Step 203 as the user proceeds to read near the end of the content page.

Figure 7:
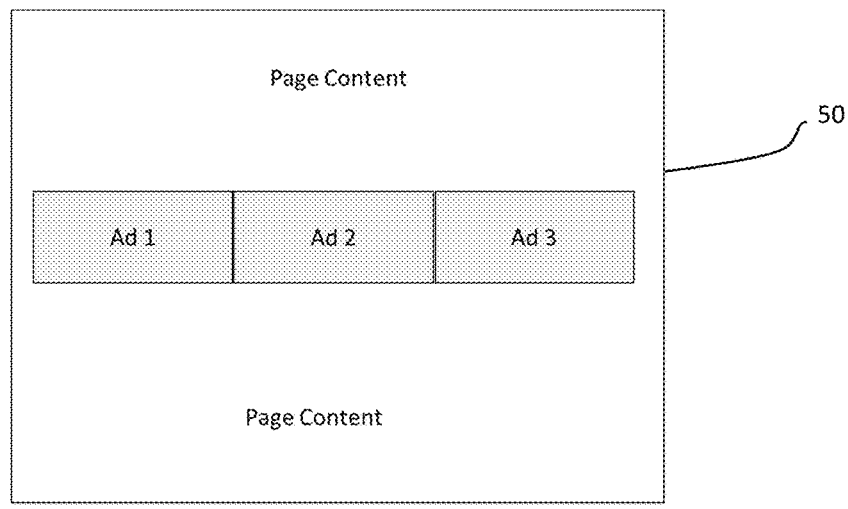
FIG. 7 exemplary shows a third depiction of the exemplary web page 50 displayed on a display device 150.

With reference to FIG. 5, the system 500 receives one or more initial advertisement group(s), each group including at least one or more advertisements. For example, as shown in FIG. 7, the system 500 receives an advertisement group including "Ad1", "Ad2", and "Ad3" which are displayed on a portion of the web page between content of the web page. Although FIG. 7 exemplarily shows the first advertisement group including three types of advertisements to be populated, the invention is not limited thereto.

It is noted that the advertisement group is served from the database 130 to the system 500 based upon any traditional advertising process.

The eye-reaction of the reader is monitored for the advertisement group (and each advertisement of the advertisement group) by the eye-reaction tracking circuit 501. Thus, the eye-reactions of the user are measured by the eye-reaction tracking circuit 501 via a sensor 540 such as fixations, scan paths, saccades and/or regressions to gauge a level of engagement of the user with each advertisement of the advertisement group. In other words, the eye-reaction tracking circuit 501 tracks the level of engagement the user with each of the advertisements of the advertisement group by tracking the eye-reactions of the user with reference to the web page (i.e., the advertisements with which the user is engaged).

The sensor 540 can include any eye gaze tracking technology that is able to map the focus of the eye on the display device 550 (x,y) co-ordinates to the text and image content on the display device 550.

The interest calculating circuit 502 dynamically calculates an interest of the user of a particular advertisement of the advertisement group over time and assigns each advertisement a user engagement value based on the eye-tracking of the eye-tracking circuit 501. For example, at time zero the web page is opened/generated and an advertisement group is populated as shown in FIG. 7. From time zero to a first predetermined time as calculated by the auction timing calculating circuit 503 (and as described later), the eye-reaction tracking circuit 501 tracks the user's eyes and the interest calculating circuit 502 calculates the user engagement value based on the user's eye movement.

Figure 8:
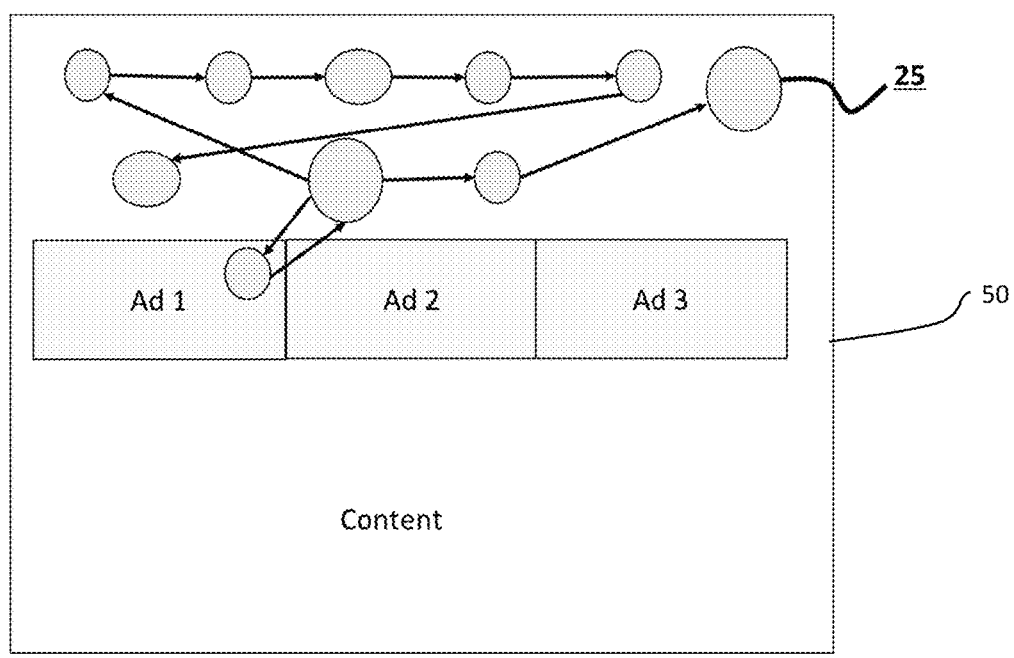
FIG. 8 exemplary shows a fourth depiction of the exemplary web page 50 displayed on a display device 150 including user fixation points 25.

As shown in FIG. 8, the eye gaze of the user is reading the page content above the advertisement group and at some point the user's attention is drawn to "Ad 1". As the user continues to read until the first predetermined time, the user does not give any attention to "Ad 2" and "Ad 3". When the first predetermined time occurs, the interest calculating circuit 502 assigns the user engagement value to each advertisement of the advertisement group. Based on FIG. 8, the interest calculating circuit 502 can set the user engagement value of "Ad 1" to a first value indicative of the user engagement tracked by the eye-reaction tracking circuit 501, and the user engagement value of "Ad 2" and "Ad 3" to a zero value since the user did not look at the advertisements.

Figure 9:
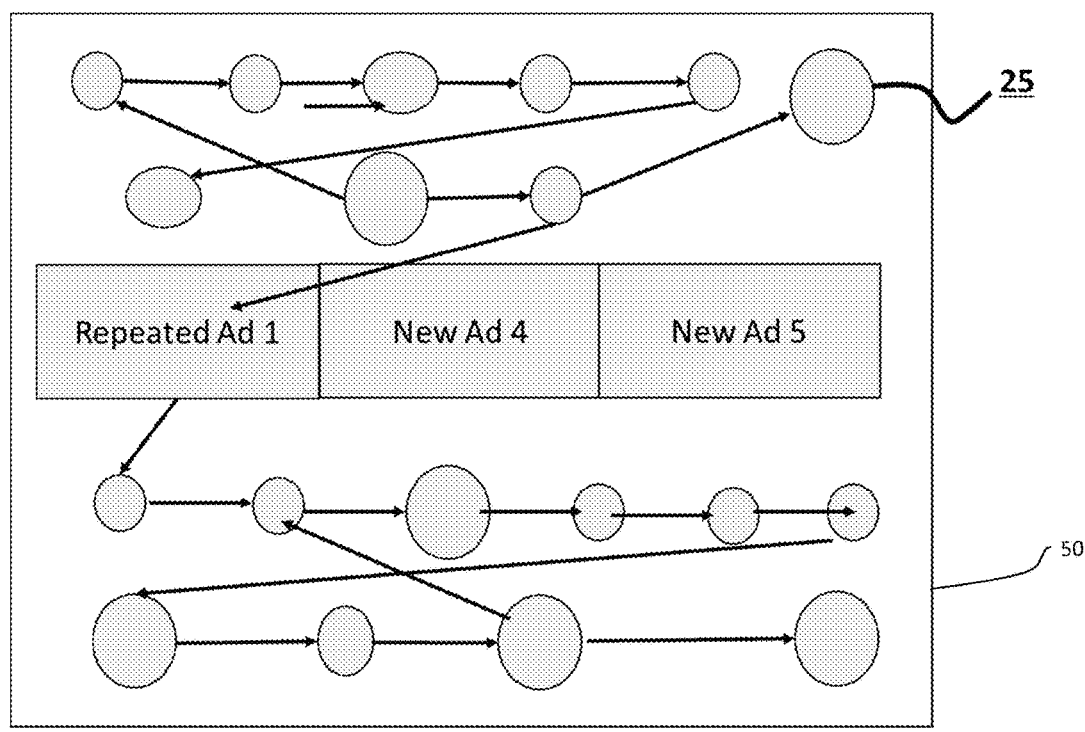
FIG. 9 exemplary shows a fifth depiction of the exemplary web page 50 displayed on a display device 150 including user fixation points 25.

It is noted that the size of the circles on FIG. 8 and FIG. 9 indicate a time spent by the user at a particular point on the web page with the larger the circle representing the more time spent (i.e., the more engaged the user is with that particular point).

The auctioning timing calculating circuit 503 determines the time(s) at which to cause the auctioning circuit 504 to conduct an auction. That is, the auction timing calculating circuit 503 can determine to have an auction at a set time interval, or at a time in which the user is nearly finished with the page content above the advertisement, or at a time when the user engagement value of any advertisement reaches a predetermined threshold value, etc.

The auctioning circuit 504 receives in-page remarketing policies (i.e., an advertiser's parameters) from the advertisement sellers stored in the database 530 such as the remarketing advertisement budget, content, modality, etc. The auctioning circuit 504 conducts an advertisement auction by using the advertiser parameters and the user engagement values set by the interest calculating circuit 502. The auctioning circuit 504 determines advertisements that "win" the auction in which one or more winning advertisements/advertisers want to distribute particular advertisements (or remarket advertisements) based on the user engagement values.

The advertisement company owning "Ad 1" may have an advertisement parameter to repeat the "Ad 1" if the "Ad 1" receives a highest user engagement value out of the advertisement group. Further, the advertisement company or companies owning "Ad 2" and "Ad 3" may have an advertisement parameter not to repeat or remarket the advertisements if a zero value is returned for the user engagement value.

Therefore, the distribution circuit 505 populates the advertisement group based on the results of the auction. As shown in FIG. 9, the distribution circuit 505 populates the first advertisement slot with a repeat of "Ad 1" and populates the other two slots with a "New Ad 4" and "New Ad 5" because the owners of "New Ad 4" and "New Ad 5" have an advertisement parameter to attempt to win the auction if the advertisements are being repopulated and other advertisements gave a zero score.

As shown in FIG. 9, as the user progresses through the page content of the web page on the display device 550, the user is "re-attracted" to the repeat of "Ad 1" which is re-populated by the distribution circuit 505 on a same page that the user is viewing.

Thus, the system 500 enables a dynamic evolution of the advertisements such that advertisement companies can better allocate their advertising funds to re-populate or target specific user's based on user engagement in their advertisements, advertisement of a competitor, or any other condition desirable. Further, by dynamically re-populating an existing advertisement group with advertisements, even the re-population can trigger user interest by a new image being depicted on the web page which can result in better marketing to users.

Figure 6:
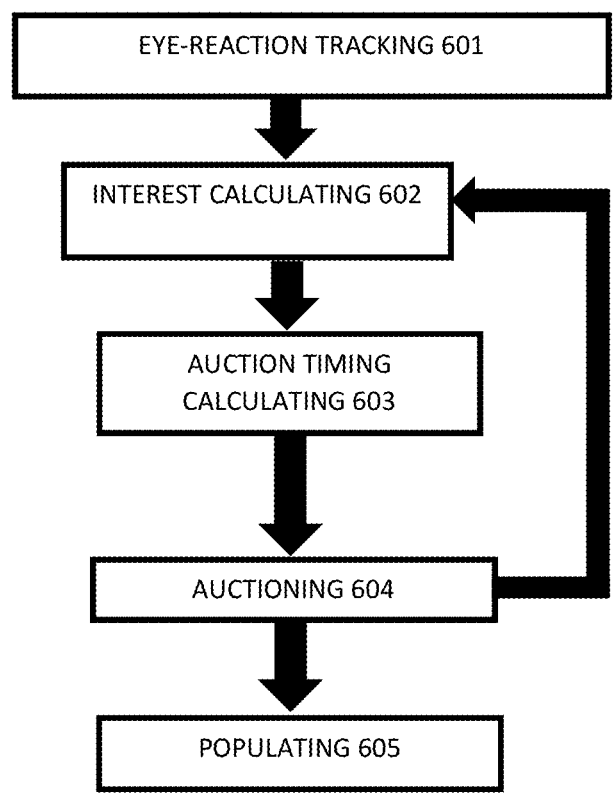
FIG. 6 exemplarily shows a high level flow chart for an advertisement updating method 600.

FIG. 6 shows a high level flow chart for a method 600 of advertisement updating.

Step 601 monitors the eye-reaction of the user for the advertisement group (and each advertisement of the advertisement group) to measure a user engagement with the advertisements.

Step 602 dynamically calculates an interest of the user of a particular advertisement of the advertisement group over time and assigns each advertisement a user engagement value based on the eye-tracking of Step 601.

Step 603 determines the time(s) at which to cause Step 604 to conduct an auction.

Step 604 conducts an advertisement auction at the time(s) determined by Step 603 and by using the user engagement value for the user calculated by Step 602, along with the attributes of each of the advertisements, as well as the marketing and remarketing advertisement details and policies obtained from the advertisers from a database 530. That is, step 604 determines advertisements that "win" the auction in which one or more winning advertisements/advertisers want to distribute particular advertisements (or remarket advertisements) based on the user engagement results of Step 602.

Step 605 populates the advertisement group based on the results of the auction. That is, Step 605 dynamically distributes the later set of winning advertisements based upon the live in-session auction results of Step 203 as the user proceeds to read near the end of the content page.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 10, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An advertisement distribution system, comprising:
    an eye-reaction tracking circuit configured to track eye-reaction of a user for each of a plurality of advertisements of at least a first advertisement group on a web page displayed on a display device, the eye-reaction being an evolving user interest towards the plurality of advertisements;
    a scoring circuit configured to calculate a score for each of the plurality of advertisements of the first advertisement group based on the tracked eye-reaction of the user;
    an auctioning circuit configured to repeatedly conduct an auction at dynamically decided time intervals to determine winning advertisements based on advertiser parameters received from a database and the score of each of the plurality of advertisements; and
    a distribution circuit configured to dynamically populate an empty advertisement group having a plurality of empty advertisement slots with the winning advertisements during a same viewing session of the web page by dynamically rendering the winning advertisement of the auction on the web page as the evolving user interest towards the plurality of advertisements changes at the dynamically decided time intervals,
    wherein the empty advertisement group is disposed in a portion of the web page that has not yet been displayed by the display device and not yet viewed by the user.

2. The system of claim 1, wherein the first advertisement group is disposed on a portion of the web page that is immediately viewable by the user when the web page is generated on the display device.

3. The system of claim 1, wherein a number of the plurality of advertisements of the first advertisement group equals a number of the plurality of empty advertisement slots of the empty advertisement group.

4. The system of claim 1, wherein the scoring circuit calculates the score of each of the plurality of advertisements of the first advertisement group based on a predetermined set of parameters of the eye-reaction of the user.

5. The system of claim 1, wherein the scoring circuit calculates the score of each of the plurality of advertisements of the first advertisement group based on each of the plurality of advertisements being given a portion of a total score relative to each other.

6. The system of claim 1, wherein the scoring circuit calculates the score of each of the plurality of advertisements of the first advertisement group based on a comparison to a previously tracked amount of eye-reaction of the user and a previous score calculated by the scoring circuit.

7. The system of claim 1, wherein the empty advertisement group is located after content of the web page.

8. The system of claim 1, wherein the empty advertisement group is within a same web page as the first advertisement group.

9. The system of claim 1, wherein the advertiser parameters include marketing and remarketing advertisement policies of an advertiser.

10. The system of claim 1, wherein the web page includes a plurality of empty advertisement groups such that the next empty advertisement group of the plurality of advertisement groups is populated by the distribution circuit based on a score calculated for the previous empty advertisement group that has been populated.

11. An advertisement distribution method, comprising:
    tracking eye-reaction of a user for each of a plurality of advertisements of at least a first advertisement group on a web page displayed on a display device, the eye-reaction being an evolving user interest toward the plurality of advertisements;
    calculating a score for each of the plurality of advertisements of the first advertisement group based on the tracked eye-reaction of the user;
    repeatedly conducting an auction at dynamically decided time intervals to determine winning advertisements based on advertiser parameters received from a database and the score of each of the plurality of advertisements; and dynamically populating an empty advertisement group having a plurality of empty advertisement slots with the winning advertisements by dynamically rendering the winning advertisement of the auction on the web page as the evolving user interest towards the plurality of advertisements changes at the dynamically decided time intervals, wherein the empty advertisement group is disposed in a portion of the web page that has not yet been displayed by the display device and not yet viewed by the user.

12. The method of claim 11, wherein the first advertisement group is disposed on a portion of the web page that is immediately viewable by the user when the web page is generated on the display device.

13. The method of claim 11, wherein a number of the plurality of advertisements of the first advertisement group equals a number of the plurality of empty advertisement slots of the empty advertisement group.

14. The method of claim 11, wherein the calculating calculates the score of each of the plurality of advertisements of the first advertisement group based on a predetermined set of parameters of the eye-reaction of the user.

15. The system of claim 1, wherein the auctioning circuit dynamically conducts the auction as a live-auction for the advertisements between multiple potential advertisers such that the winning advertisements are selected for showing to the user later within the same content not yet viewed by the user.

16. The system of claim 1, wherein the existing advertisements are dynamically updated based on a change in an interest of the user as determined by the eye-reaction of a user.

17. The system of claim 1, the evolving user interest includes an interest towards the plurality of advertisements on the web page during a single viewing session.

* * * * *